(12) United States Patent
Angot et al.

(10) Patent No.: US 8,345,958 B2
(45) Date of Patent: Jan. 1, 2013

(54) METHOD AND SYSTEM FOR DEVELOPING NEW-VIEW IMAGE

(75) Inventors: Ludovic Angot, Hsinchu (TW); Wei-Jia Huang, Puli Township, Nantou County (TW); Kai-Che Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 590 days.

(21) Appl. No.: 12/650,703

(22) Filed: Dec. 31, 2009

(65) Prior Publication Data

US 2011/0158512 A1    Jun. 30, 2011

(51) Int. Cl.
G06K 9/00    (2006.01)
(52) U.S. Cl. ........................................ 382/154; 382/162
(58) Field of Classification Search .................. 382/154, 382/162, 167, 284, 293, 294, 295; 345/419, 345/421, 422, 423
See application file for complete search history.

(56) References Cited

U.S. PATENT DOCUMENTS

| | | | |
|---|---|---|---|
| 5,684,939 A | 11/1997 | Foran et al. | |
| 7,136,522 B2 * | 11/2006 | Harrington et al. | 382/166 |
| 7,711,181 B2 * | 5/2010 | Kee et al. | 382/154 |
| 2006/0232666 A1 | 10/2006 | Op De Beeck et al. | |
| 2011/0025690 A1 * | 2/2011 | Tzur et al. | 345/423 |

* cited by examiner

Primary Examiner — Phuoc Tran
(74) Attorney, Agent, or Firm — McClure, Qualey & Rodack, LLP

(57) ABSTRACT

A method and a system for developing a new-view image from an original image with a corresponding depth map is provided. The original image has a plurality of original pixels and the new-view image has at least a new-view pixel. The method for developing the new-view image comprises the following steps. According to a corresponding depth value of each original pixel, a corresponding position of each original pixel corresponding to the new-view pixel is estimated. An occupancy proportion of each original pixel occupying the new-view pixel is estimated according to the corresponding position of each original pixel. An estimated color of an estimated partial pixel of the new-view pixel is initially obtained according to the occupancy proportion of one selected original pixel. The estimated partial pixel is updated according to the occupancy proportions and estimated occlusion proportion of the other selected original pixels one by one.

18 Claims, 9 Drawing Sheets

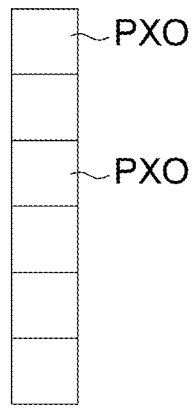
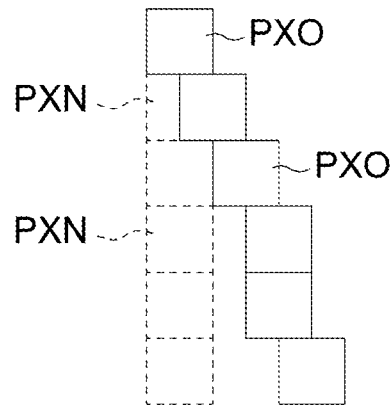
FIG. 5  FIG. 6
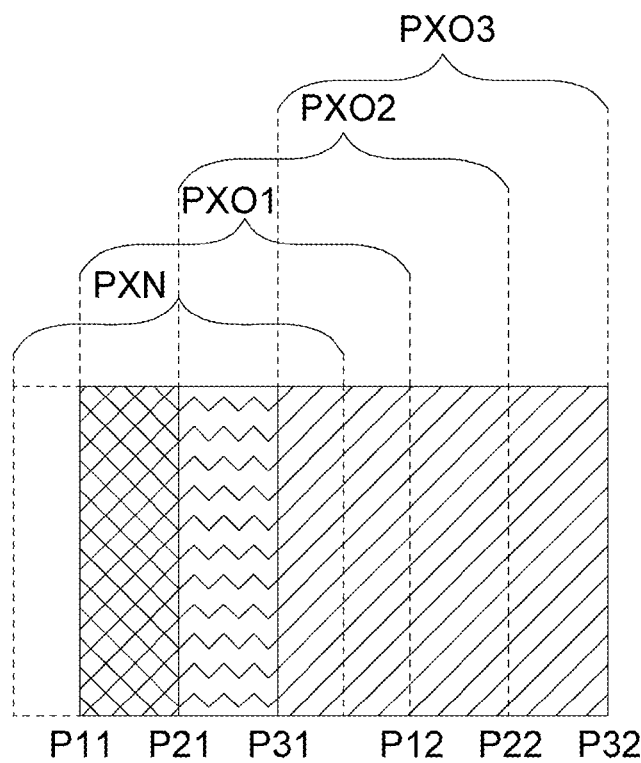
FIG. 7

METHOD AND SYSTEM FOR DEVELOPING NEW-VIEW IMAGE

BACKGROUND

1. Technical Field

The disclosure relates in general to a method and a system for developing an image, and more particularly to a method and a system for developing a new-view image.

2. Description of the Related Art

In the age of digitalization, the digital image has advantages of easy to store, easy to carrier and easy to modify, such that the digital image gradually replaces the traditional photo.

As the development of technology of digital image, the editing method of the digital image is greatly improved. After editing, the digital image can be added an interesting object or be modified into a new-view image.

However, many conventional methods for developing a new-view image are much complex. The process time of some of the conventional method are very long, such that they still may not be applied in a real-time system.

SUMMARY

The disclosure is directed to a method and a system for developing a new-view image. The estimated color is updated according to the original pixels one by one. As a result, the method may be simplified and the complexity may be reduced.

According to the present disclosure, a method for developing a new-view image from an original image with a corresponding depth map is provided. The original image has a plurality of original pixels and the new-view image has at least a new-view pixel. The method for developing the new-view image comprises the following steps. A corresponding position of each original pixel corresponding to the new-view pixel is estimated by an estimating unit according to a corresponding depth value of each original pixel. An occupancy proportion of each original pixel occupying the new-view pixel is estimated by the estimating unit according to the corresponding position of each original pixel. An estimated partial pixel of the new-view pixel is a sub-pixel that records an estimated color and an occupancy proportion formed by some of the original pixels which occupy the new-view pixel. The estimated color of the estimated partial pixel of the new-view pixel is initially obtained by an analyzing unit according to the occupancy proportion of one selected original pixel. Than, the estimated partial pixel is updated by the analyzing unit according to the occupancy proportions of the other selected original pixels one by one.

According to the present disclosure, a system for developing a new-view image from an original image with a corresponding depth map is provided. The original image has a plurality of original pixels. The new-view image has at least a new-view pixel. The system for developing the new-view image comprises an estimating unit and an analyzing unit. The estimating unit is for estimating a corresponding position of each original pixel corresponding the new-view pixel according to a corresponding depth value of each original pixel and estimating an occupancy proportion of each original pixel occupying the new-view pixel according to the corresponding position of each original pixel. The analyzing unit is for initially obtaining an estimated color of an estimated partial pixel of the new-view pixel according to the occupancy proportion of one selected original pixel and updating the estimated partial pixel according to the occupancy proportions of the other selected original pixels one by one.

The disclosure will become apparent from the following detailed description of the preferred but non-limiting embodiments. The following description is made with reference to the accompanying drawings.

BRIEF DESCRIPTION OF THE DRAWINGS

FIG. 5 shows a plurality of original pixels of an original image;
FIG. 6 shows a plurality of new-view pixels of a new-view image;
FIG. 7 shows three original pixels which occupy a new-view pixel.

DETAILED DESCRIPTION

Figure 1:
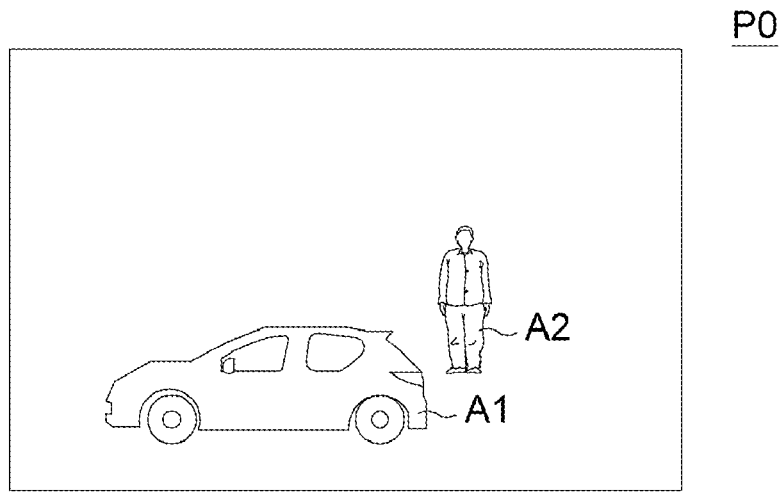
FIG. 1 illustrates an original image.

Please referring to FIG. 1, an original image P0 is illustrated in FIG. 1. The original image P0 is shot from a user at a particular view configuration. The depths between the objects and the user are different. For example, the depth of the first object A1 is less than that of the second object A2.

Figure 2:
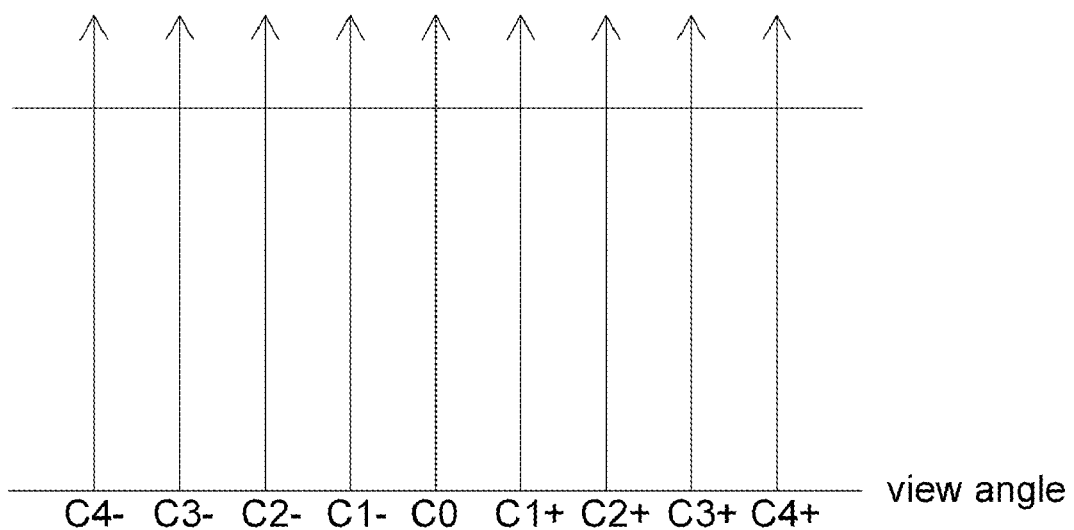
FIG. 2 illustrates several new-view configurations.

Please referring to FIG. 2, several new-view configurations are illustrated in FIG. 2. The original image P0 is shot at view configuration C0. When the user moves to view configuration C1+ to C4+ or C1− to C4−, the first object A1 and the second object A2 will shift toward right or left, respectively.

Figure 3:
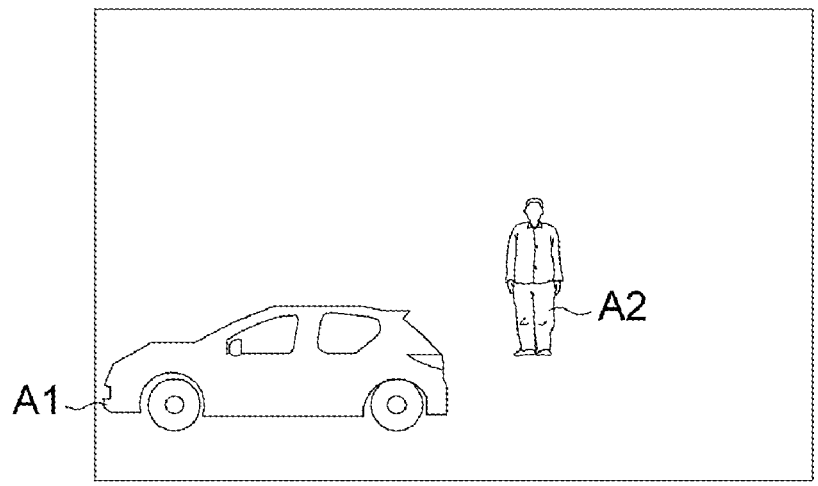
FIG. 3 illustrates a new-view image.

For example, please referring to FIG. 3, a new-view image P4+ is illustrated in FIG. 3. Because the first object A1 is located near the left side of the original image P0 and the second object A2 is located near the right side of the original image P0, as the user moves toward right, the first object A1 and the second object A2 will shift toward left and the shift distance of the first object A1 is larger than that of the second object A2.

Figure 4:
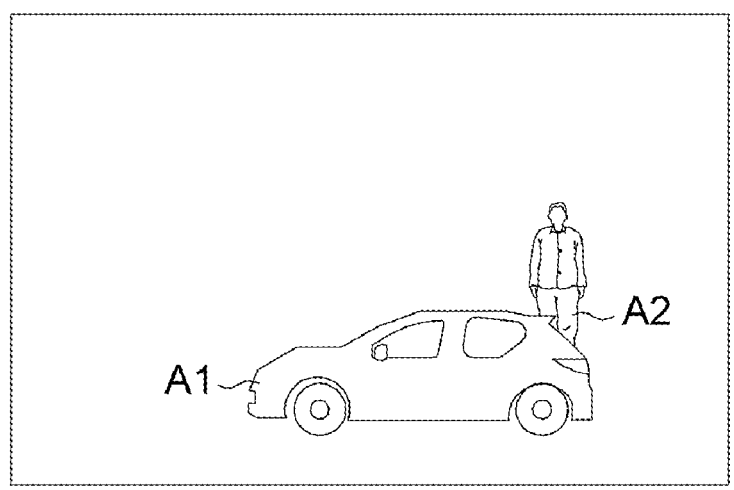
FIG. 4 illustrates another new-view image.

Please referring to FIG. 4, another new-view image P4− is illustrated in FIG. 4. As the user moves toward left, the first object A1 and the second object A2 will shift toward right and the shift distance of the first object A1 is larger than that of the second object A2.

Please referring to FIGS. 5-6, FIG. 5 shows a plurality of original pixels PXO of an original image with a corresponding depth map and FIG. 6 shows a plurality of new-view pixels PXN of a new-view image. As shown in FIG. 5, the original pixels PXO are arranged in a line. Because the corresponding depth values of the original pixels PXO are different, the original pixels PXO will shift by different distances at the new-view configuration (shown as FIG. 6). In the new-view image, the new-view pixels PXN are still arranged in a line; however, the original pixels PXO at the new-view configuration do not arranged in the line. The occupancy proportion of each original pixel PXO occupying each corresponding new-view pixel PXN are different.

Usually, one new-view pixel PXN may be occupied by more than two original pixels PXO at a new-view configuration whose occupancy proportions are different. Please referring to FIG. 7, FIG. 7 shows three original pixels PXO1, PXO2, PXO3 at a new-view configuration which occupy a new-view pixel PXN. An estimated color of the new-view pixel PXN can be estimated according to the original pixels PXO1, PXO2, PXO3. A new-view image has a plurality of new-view pixels PXN. The new-view image is developed by estimating the estimated color of all the new-view pixels PXN.

Figure 8A:
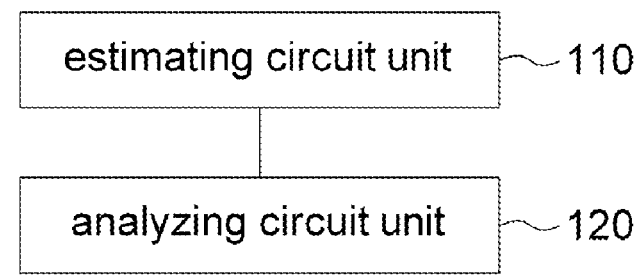
FIG. 8A is a block diagram of a system 100 for developing a new-view image from an original image.

Please referring to FIG. 8A, FIG. 8A is a block diagram of a system 100 for developing a new-view image from an original image. The system 100 includes an estimating unit 110 and an analyzing unit 120. The estimating unit is used for estimating some data. The analyzing unit is used for analyzing some data. By estimating and analyzing the data of the original image, a new-view image can be developed.

Figure 8B:
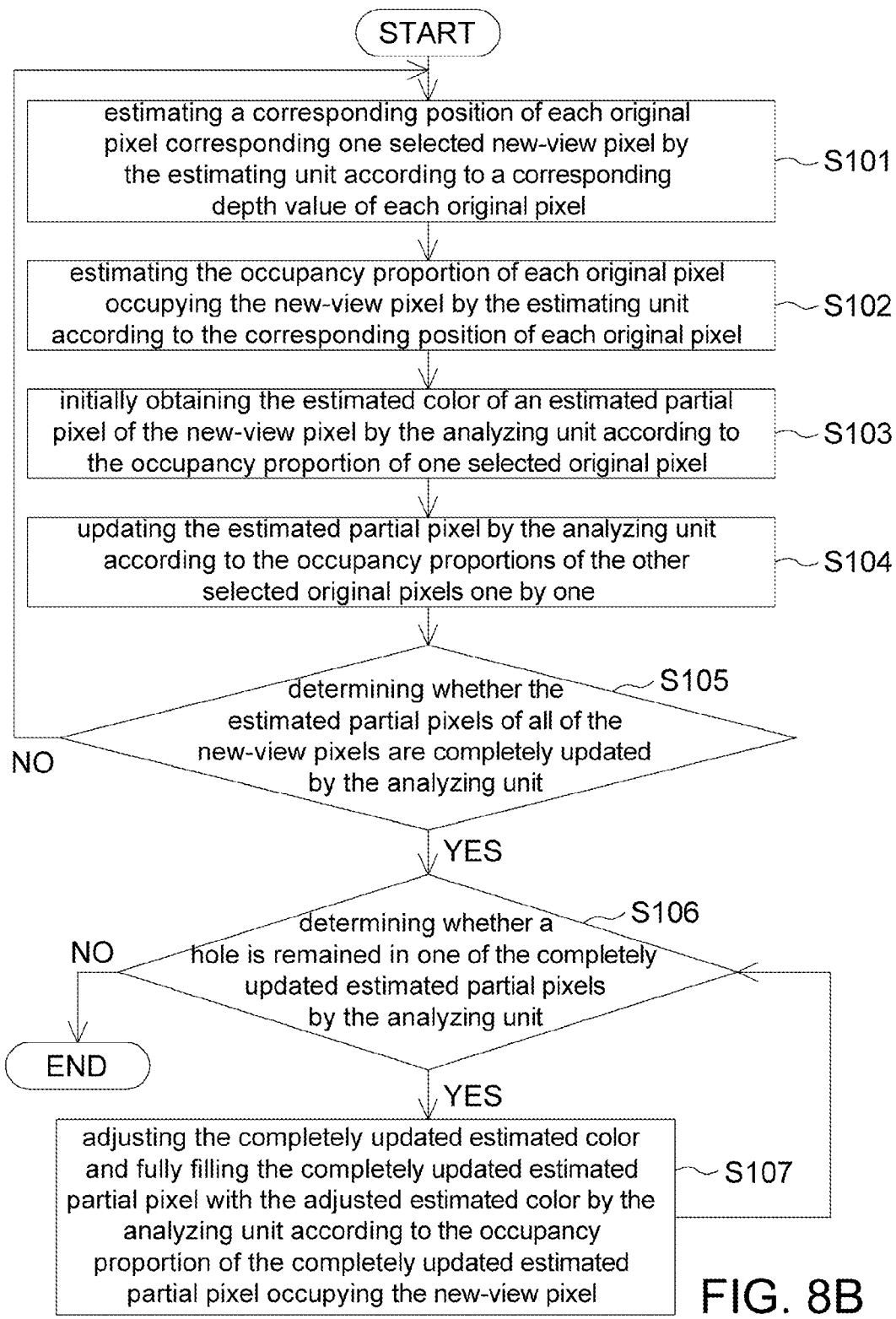
FIG. 8B is a flowchart of a method for developing a new-view image from an original image.

Please refer to FIG. 8B. FIG. 8B is a flowchart of a method for developing a new-view image from an original image. The flowchart will be illustrated by taking the original pixels PXO1, PXO2, PXO3 and the new-view PXN in FIG. 7 as an example.

Firstly, the method begins at step S101, a corresponding position of each original pixel corresponding to one selected new-view pixel is estimated by the estimating unit 110 according to a corresponding depth value of each original pixel. In FIG. 7, the corresponding position of the original pixel PXO1 is located between point P11 and point P12, the corresponding position of the original pixel PDX2 is located between point P21 and point P22, and the corresponding position of the original pixel PXO3 is located between point P31 and point P32.

Next, the method proceeds to step S102, the occupancy proportion of each original pixel occupying the new-view pixel is estimated by the estimating unit 110 according to the corresponding position of each original pixel at a new-view configuration. In FIG. 7, the occupancy proportion of the original pixel PXO1 is 80%, the occupancy proportion of the original pixel PXO2 is 50%, and the occupancy proportion of the original pixel PXO3 is 20%.

Figure 9:
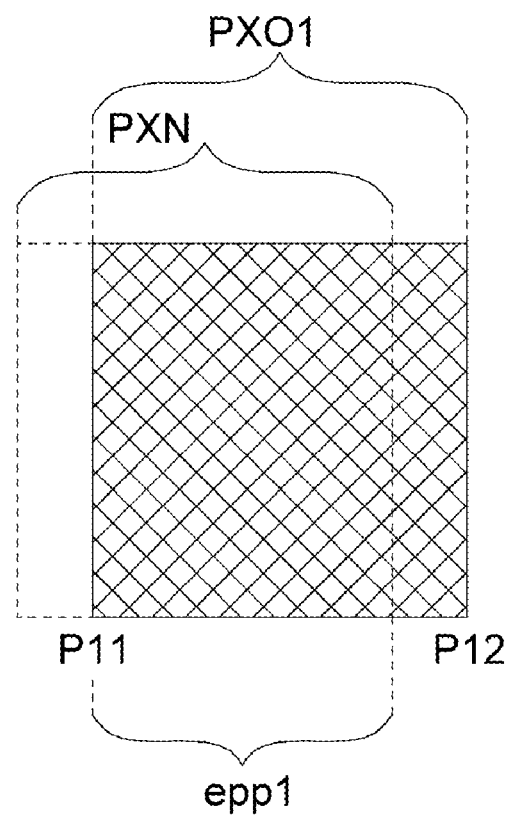
FIG. 9 shows the relationship between the first selected original pixel and the new-view pixel of FIG. 7.

Then, the method proceeds to step S103, the estimated color of an estimated partial pixel of the new-view pixel is initially obtained by the analyzing unit 120 according to the occupancy proportion of one selected original pixel. Please referring to FIG. 9, FIG. 9 shows the relationship between the first selected original pixel PXO1 and the new-view pixel PXN of FIG. 7. In this example, the original color of the first selected original pixel PXO1 is 220 (represented by an intersection pattern of FIG. 9) and the occupancy proportion of the first selected original pixel PXO1 occupying the new-view pixel is 80%, therefore the estimated color is 220*80%=176 (represented by the intersection pattern of FIG. 10) and the occupancy proportion of the estimated partial pixel epp1 occupying the new-view pixel PXN is 80%.

Next, the method proceeds to step S104, the estimated partial pixel is updated by the analyzing unit 120 according to the occupancy proportions of the other selected original pixels one by one. In step S104, the estimated color is updated by $C_{ori} \cdot \beta + C_{est} \cdot (\alpha - \gamma)/\alpha$, the occupancy proportion of the present estimated partial pixel is updated by $\alpha + \beta - \gamma$, $C_{ori}$ is the original color of the selected original pixel, $\beta$ is the occupancy proportion of the selected original pixel, $C_{est}$ is the estimated color of the previous estimated partial pixel, $\alpha$ is the occupancy proportion of the previous estimated partial pixel, and $\gamma$ is an overlapping proportion of the selected original pixel and the previous estimated partial pixel. Wherein, $\gamma$ is obtained by $\rho \cdot \min(\alpha, \beta) + (1-\rho) \cdot \max(0, \alpha+\beta-1)$, and $0 \leq \rho \leq 1$.

Figure 10:
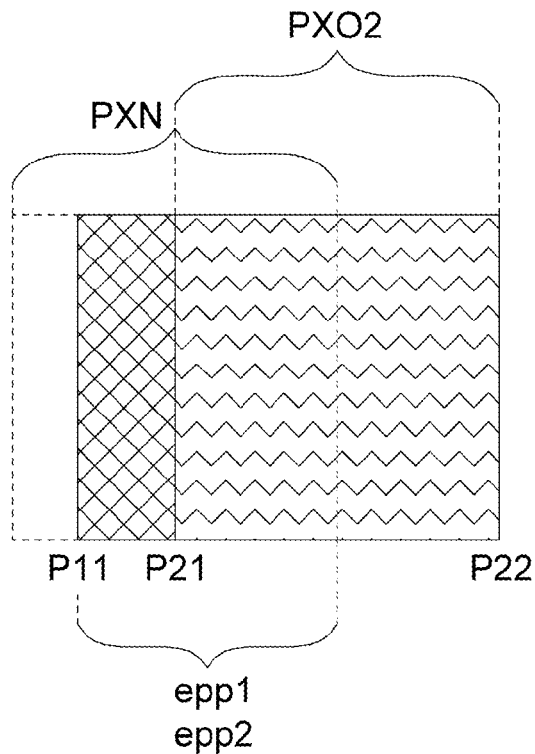
FIG. 10 shows the relationship between a second selected original pixel, the previous estimated partial pixel and the new-view pixel of FIGS. 7 and 9.

Please referring to FIG. 10, FIG. 10 shows the relationship between a second selected original pixel PXO2, the previous estimated partial pixel epp1 and the new-view pixel PXN of FIGS. 7 and 9. The original color of the second selected original pixel PXO2 is 100 (represented by a wave pattern of FIG. 10) and the occupancy proportion of the second selected original pixel PXO2 occupying the new-view pixel PXN is 50%. The estimated color of the previous estimated partial pixel epp1 is 176 (represented by the intersection pattern of FIG. 10), and the occupancy proportion of the previous estimated partial pixel epp1 is 80%. The overlapping proportion of the second selected original pixel PXO2 and the previous estimated partial pixel epp1 is 50%. Therefore, the estimated color is updated by $$C_{ori} \cdot \beta + C_{est} \cdot (\alpha-\gamma)/\alpha = 100*50\% + 176*(80\%-50\%)/80\% = 116$$

Figure 11:
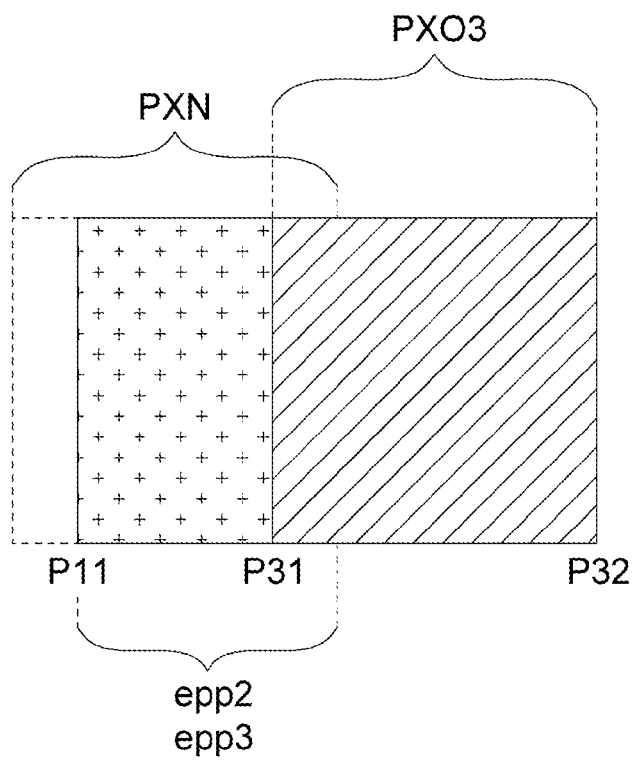
FIG. 11 shows the relationship between a third selected original pixel, the previous estimated partial pixel and the new-view pixel of FIGS. 7 and 10.

(represented by a crisscross pattern of FIG. 11). A new estimated partial pixel epp2 is developed and the occupancy proportion of the estimated partial pixel epp2 occupying the new-view pixel PXN is updated by 80%.

Please referring to FIG. 11, FIG. 11 shows the relationship between a third selected original pixel PXO3, the previous estimated partial pixel epp2 and the new-view pixel PXN of FIGS. 7 and 10. The original color of the third selected original pixel PXO3 is 40 (represented by a slash pattern of FIG. 11) and the occupancy proportion of the third selected original pixel PXO3 occupying the new-view pixel PXN is 20%. The estimated color of the previous estimated partial pixel epp2 is 116 (represented by the crisscross pattern of FIG. 11), and the occupancy proportion of the previous estimated partial pixel epp2 occupying the new-view pixel PXN is 80%. The overlapping proportion of the third selected original pixel PXO3 and the previous estimated partial pixel epp2 is 20%. Therefore, the estimated color is updated by $$C_{ori} \cdot \beta + C_{est} \cdot (\alpha-\gamma)/\alpha = 40*20\% + 116*(80\%-20\%)/80\% = 96$$

Figure 12:
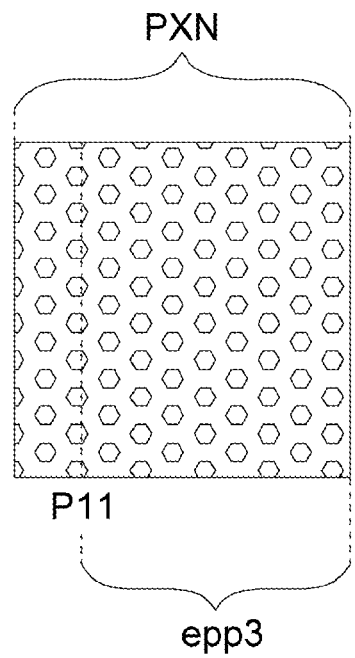
FIG. 12 shows a developed new-view pixel.

(represented by a hexagon pattern of FIG. 12). A new estimated partial pixel epp3 is developed and the occupancy proportion of the updated estimated partial pixel epp3 occupying the new-view pixel PXN is 80%.

If there is another original pixel occupying the new-view pixel PXN, then the step S104 is repeated until all of the original pixels which occupy the new-view pixel PXN is calculated in step S104.

In the step S103 and S104, if the new-view image is a left-view image, then the estimated color is initially obtained according to the occupancy proportion of the rightmost original pixel and the estimated partial pixel are updated according to the occupancy proportions of the other selected original pixels from right to left. Therefore, the original pixel whose corresponding depth value is smallest is taken into account last.

On the other hand, if the new-view image is a right-view image, then the estimated color is initially obtained according to the occupancy proportion of the rightmost original pixel and the estimated partial pixel are updated according to the occupancy proportions of the other selected original pixels from left to right. Therefore, the original pixel whose corresponding depth value is smallest is taken into account last.

Then, the method proceeds to step S105, whether the estimated partial pixels of all of the new-view pixels are completely updated is determined by the analyzing unit 120. If the estimated partial pixels of all of the new-view pixels are completely updated, then the method proceeds to step S106; if the estimated partial pixels of all of the new-view pixels are not completely updated, then the method is return to step S101. That is, the steps S101 to S104 are performed repeatedly until all of the estimated partial pixels of all of the new-view pixels are completely updated.

In step S106, whether a hole is remained in one of the completely updated estimated partial pixels is determined by the analyzing unit 120. If a hole is remained in one of the completely updated estimated partial pixels (i.e. the occupancy proportion of one of the completely updated estimated partial pixels α is less than 100%), then the method proceeds to step S107. If there is no hole remained in all of the completely updated estimated partial pixels (i.e. the occupancy proportion α of all of the completely updated estimated partial pixels are equal to 100%), then the method is terminated.

In the step S107, the completely updated estimated color is adjusted and the completely updated estimated partial pixel is fully filled with the adjusted estimated color by the analyzing unit 120 according to the occupancy proportion of the completely updated estimated partial pixel occupying the new-view pixel. In FIG. 11, the completely updated estimated color of the completely updated estimated partial pixel epp3 is 68 and the occupancy proportion of the completely updated estimated partial pixel epp3 occupying the new-view pixel PXN is 80%. Please referring to FIG. 12, FIG. 12 shows a developed new-view pixel PXN. The completely updated estimated color is adjusted by $C_{est}/\alpha=68/80\%=85$ (represented by the hexagon pattern of FIG. 12), and the new-view pixel PXN is fully filled with the adjusted estimated color. Furthermore, if α is equal to 0%, then the new-view pixel PXN is fully filled by other hole filling method, such as an inpainting method.

Figure 13:
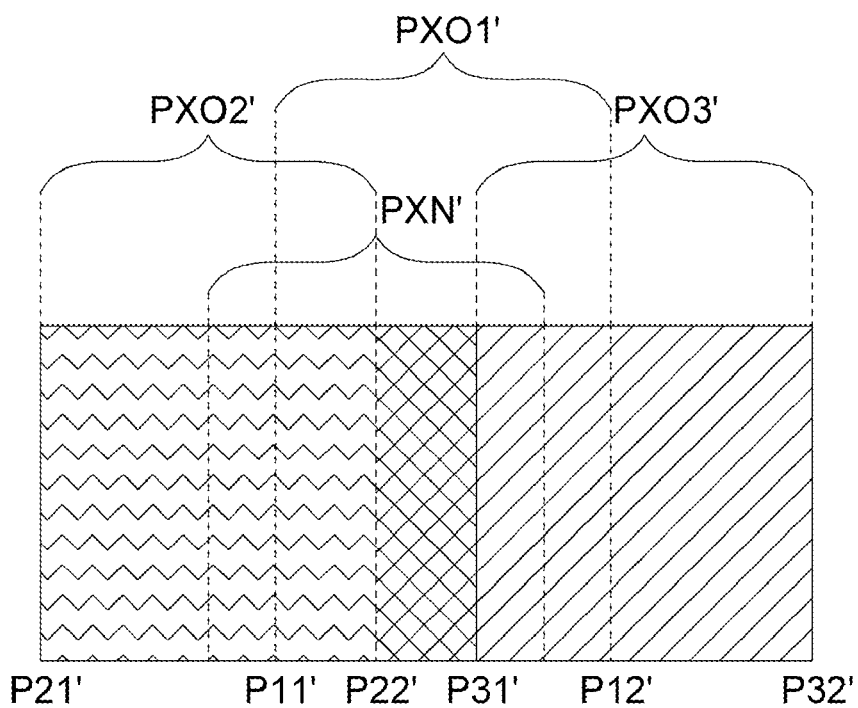
FIG. 13 shows other three original pixels which occupy another new-view pixel.

Please referring to FIG. 13, FIG. 13 shows other three original pixels PXO1', PXO2', PXO3' at the new-view configuration which occupy another new-view pixel PXN'. In other embodiment, the flowchart of FIG. 8 will illustrate by taking the original pixels PXO1', PXO2', PXO3' and the new-view pixel PXN' in FIG. 13 as an example.

Firstly, the method begins at step S101, a corresponding position of each original pixel corresponding to one selected new-view pixel is estimated according to a corresponding depth value of each original pixel. In FIG. 13, the corresponding position of the original pixel PXO1' is located between P11' and P12', the corresponding position of the original pixel PXO2' is located between P21' and P22', and the corresponding position of the original pixel PXO3' is located between P31' and P32'.

Next, the method proceeds to step S102, the occupancy proportion of each original pixel occupying the new-view pixel is estimated according to the corresponding position of each original pixel at the new-view configuration. In FIG. 12, the occupancy proportion of the original pixel PXO1' is 80%, the occupancy proportion of the original pixel PXO2' is 50%, and the occupancy proportion of the original pixel PXO3' is 20%.

Figure 14:
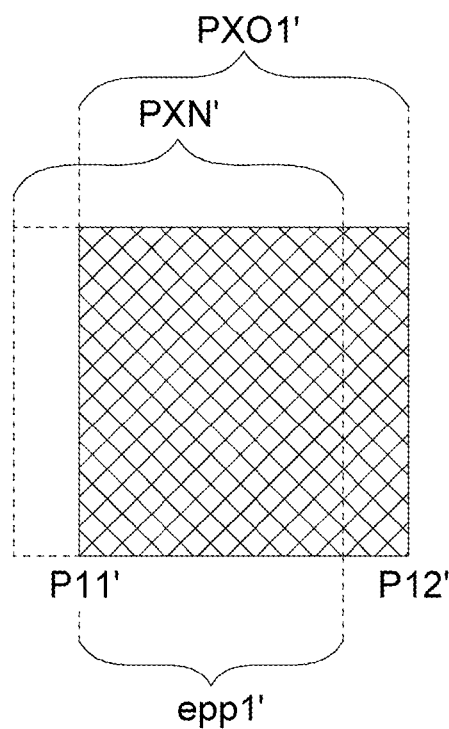
FIG. 14 shows the relationship between the first selected original pixel and the new-view pixel of FIG. 13.

Then, the method proceeds to step S103, the estimated color of an estimated partial pixel of the new-view pixel is initially obtained according to the occupancy proportion of one selected original pixel. Please referring to FIG. 14, FIG. 14 shows the relationship between the first selected original pixel PXO1' and the new-view pixel PXN' of FIG. 13. In this example, the original color of the first selected original pixel PXO1' is 70 (represented by a intersection pattern of FIG. 14) and the occupancy proportion of the first selected original pixel PXO1' occupying the new-view pixel PXN' is 80%, therefore the estimated color is 70*80%=56 (represented by the intersection pattern of FIG. 15) and the occupancy proportion of estimated partial pixel epp1' occupying the new-view pixel PXN' is 80%.

Figure 15:
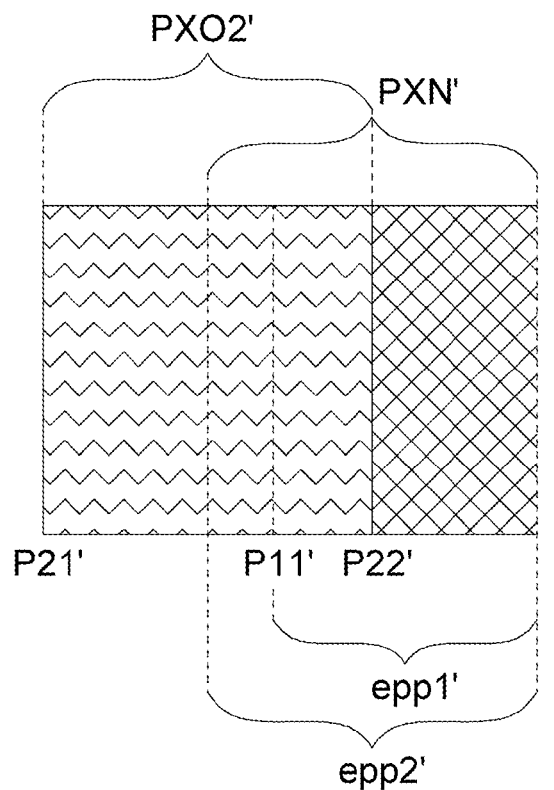
FIG. 15 shows the relationship between a second selected original pixel, the previous estimated partial pixel and the new-view pixel of FIGS. 13 and 14.

Next, the method proceeds to step S104, the estimated partial pixel is updated according to the occupancy proportions of the other selected original pixels one by one. Please referring to FIG. 15, FIG. 15 shows the relationship between a second selected original pixel PXO2', the previous estimated partial pixel epp1' and the new-view pixel PXN' of FIGS. 13 and 14. The original color of the second selected original pixel PXO2' is 60 (represented by a wave pattern of FIG. 15) and the occupancy proportion of the second selected original pixel PXO2' occupying the new-view pixel PXN' is 50%. The estimated color of the previous estimated partial pixel epp1' is 56 (represented by the intersection pattern of FIG. 15), and the occupancy proportion of the previous estimated partial pixel epp1' is 80%. The overlapping proportion of the second selected original pixel PXO2' and the previous estimated partial pixel epp1' is 30%. Therefore, the estimated color is updated by $$C_{ori}\cdot\beta+C_{est}\cdot(\alpha-\gamma)/\alpha=60*50\%+56*(80\%-30\%)/80\%=65$$

Figure 16:
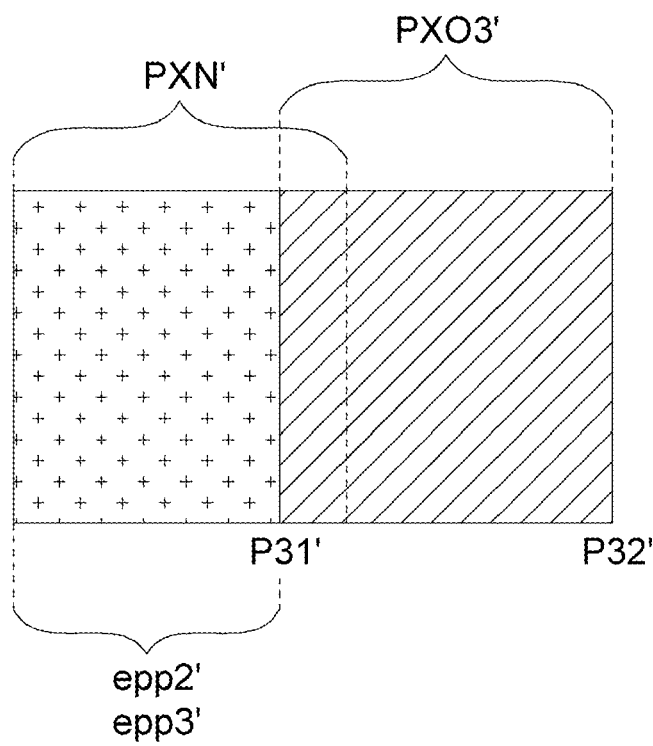
FIG. 16 shows the relationship between a third selected original pixel, the previous estimated partial pixel and the new-view pixel of FIGS. 13 and 14.

(represented by a crisscross pattern of FIG. 16). A new estimated partial pixel epp2' is developed and the occupancy proportion of the updated estimated partial pixel epp2' occupying the new-view pixel PXN' is 100%.

Please referring to FIG. 16, FIG. 16 shows the relationship between a third selected original pixel PXO3', the previous estimated partial pixel epp2' and the new-view pixel PXN' of FIGS. 13 and 15. The original color of the third selected original pixel PXO3' is 110 (represented by a slash pattern of FIG. 16) and the occupancy proportion of the third selected original pixel PXO3' occupying the new-view pixel PXN' is 20%. The estimated color of the previous estimated partial pixel epp2' is 65 (represented by the crisscross pattern of FIG. 16), and the occupancy proportion of the previous estimated partial pixel epp2' is 100%. The overlapping proportion of the third selected original pixel PXO3' and the previous estimated partial pixel epp2' occupying the new-view pixel PXN' is 20%. Therefore, the estimated color is updated by $$C_{ori}\cdot\beta+C_{est}\cdot(\alpha-\gamma)/\alpha=110*20\%+65*(100\%-20\%)/100\%=74$$

Figure 17:
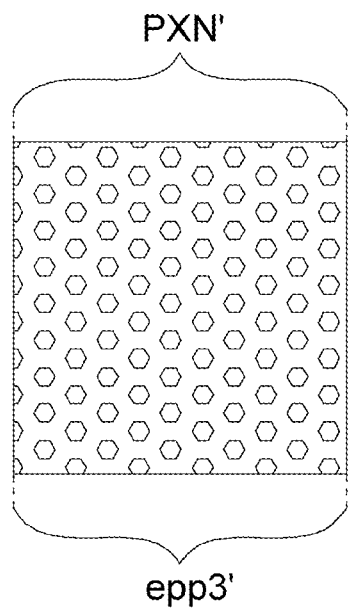
FIG. 17 shows a developed new-view pixel.

(represented by a hexagon pattern of FIG. 17). A new estimated partial pixel epp3' is developed and the occupancy proportion of the updated estimated partial pixel epp3' occupying the new-view pixel PXN' is 100%.

If there is another original pixel occupying the new-view pixel, then the step S104 is repeated until all of the original pixels which occupy the new-view pixel is calculated in step S104.

Then, the method proceeds to step S105, whether the estimated partial pixels of all of the new-view pixels are completely updated is determined. If the estimated partial pixels of all of the new-view pixels are completely updated, then the method proceeds to step S106; if the estimated partial pixels of all of the new-view pixels are not completely updated, then the method is return to step S101. That is, the steps S101 to S104 are performed repeatedly until all of the estimated partial pixels of all of the new-view pixels are completely updated.

In step S106, whether a hole is remained in one of the completely updated estimated partial pixels is determined. Please referring to FIG. 17, FIG. 17 shows a developed new-view pixel PXN'. In this example, there is no hole remained in the completely updated estimated partial pixel (i.e. the occupancy proportion α of all of the completely updated estimated partial pixel occupying the new-view pixel PXN are equal to 100%), then the new-view pixel PXN' is completely developed and the method is terminated.

While the disclosure has been described by way of example and in terms of exemplary embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for developing a new-view image from an original image with a corresponding depth map, the original image having a plurality of original pixels, the new-view image having at least a new-view pixel, the method for developing the new-view image comprising:
   estimating a corresponding position of each original pixel corresponding the new-view pixel by an estimating unit according to a corresponding depth value of each original pixel;
   estimating an occupancy proportion of each original pixel occupying the new-view pixel by the estimating unit according to the corresponding position of each original pixel;
   initially obtaining an estimated color of an estimated partial pixel of the new-view pixel by an analyzing unit according to the occupancy proportion of one selected original pixel; and
   updating the estimated partial pixel by the analyzing unit according to the occupancy proportions of the other selected original pixels one by one.

2. The method for developing the new-view image according to claim 1, wherein if the new-view image is a left-view image, then in the step of updating the estimated partial pixel, the estimated partial pixel is updated according to the occupancy proportions of the other selected original pixels from right to left.

3. The method for developing the new-view image according to claim 1, wherein if the new-view image is a left-view image, then in the step of initially obtaining the estimated color, the estimated color is initially obtained according to the occupancy proportion of the rightmost original pixel.

4. The method for developing the new-view image according to claim 1, wherein if the new-view image is a right-view image, then in the step of updating the estimated partial pixel, the estimated partial pixel is updated according to the occupancy proportions of the other selected original pixels from left to right.

5. The method for developing the new-view image according to claim 1, wherein if the new-view image is a right-view image, then in the step of initially obtaining the estimated color, the estimated color is initially obtained according to the occupancy proportion of the leftmost original pixel.

6. The method for developing the new-view image according to claim 1, wherein in the step of updating the estimated partial pixel, the estimated color of the present estimated partial pixel is updated by $C_{ori}\cdot\beta+C_{est}\cdot(\alpha-\gamma)/\alpha$, the occupancy proportion of the present estimated partial pixel is updated by $\alpha+\beta-\gamma$, $C_{ori}$ and $\beta$ are an original color and the occupancy proportion of the selected original pixel respectively, $C_{est}$ and $\alpha$ are the estimated color and the occupancy proportion of the previous estimated partial pixel respectively, $\gamma$ is an overlapping proportion of the selected original pixel and the previous estimated partial pixel, $\gamma$ is obtained by $$\rho\cdot\min(\alpha,\beta)+(1-\rho)\cdot\max(0,\alpha+\beta-1) \text{ and}$$

$$0\leq\rho\leq1.$$

7. The method for developing the new-view image according to claim 1, further comprising:
   if the estimated partial pixel are updated completely and a hole is remained in the completely updated estimated partial pixel, then the completely updated estimated color of the estimated partial pixel is adjusted by the analyzing unit and the new-view pixel is fully filled with the adjusted estimated color by the analyzing unit according to the occupancy proportion of the completely updated estimated partial pixel occupying the new-view pixel.

8. The method for developing the new-view image according to claim 7, wherein in the step of adjusting the completely updated estimated color, the completely updated estimated color is adjusted by $C_{est}/\alpha$, $C_{est}$ and $\alpha$ are the completely updated estimated color and the occupancy proportion of the completely updated estimated partial pixel respectively.

9. The method for developing the new-view image according to claim 1, wherein the new-view image has a plurality of new-view pixels, the step of estimating each corresponding position, the step of estimating each occupancy proportion, the step of initially obtaining the estimated color and the step of updating the estimated partial pixel are performed repeatedly to completely update the estimated partial pixel of each new-view pixel.

10. A system for developing a new-view image from an original image with a corresponding depth map, the original image having a plurality of original pixels, the new-view image having at least a new-view pixel, the system for developing the new-view image comprising:
    an estimating unit for estimating a corresponding position of each original pixel corresponding the new-view pixel according to a corresponding depth value of each original pixel and estimating an occupancy proportion of each original pixel occupying the new-view pixel according to the corresponding position of each original pixel; and
    an analyzing unit for initially obtaining an estimated color of an estimated partial pixel of the new-view pixel according to the occupancy proportion of one selected original pixel and updating the estimated partial pixel according to the occupancy proportions of the other selected original pixels one by one.

11. The system for developing the new-view image according to claim 10, wherein if the new-view image is a left-view image, then the analyzing unit updates the estimated partial pixel, the estimated partial pixel according to the occupancy proportions of the other selected original pixels from right to left.

12. The system for developing the new-view image according to claim 10, wherein if the new-view image is a left-view image, then the estimating unit initially obtains the estimated color according to the occupancy proportion of the rightmost original pixel.

13. The system for developing the new-view image according to claim 10, wherein if the new-view image is a right-view image, then the analyzing unit updates the estimated partial pixel according to the occupancy proportions of the other selected original pixels from left to right.

14. The system for developing the new-view image according to claim 10, wherein if the new-view image is a right-view image, then the estimating unit initially obtains the estimated color according to the occupancy proportion of the leftmost original pixel.

15. The system for developing the new-view image according to claim 10, wherein the analyzing unit updates the estimated partial pixel, the estimated color of the present estimated partial pixel by $C_{ori} \cdot \beta + C_{est} \cdot (\alpha - \gamma)/\alpha$, and updates the occupancy proportion of the present estimated partial pixel by $\alpha + \beta - \gamma$; wherein $C_{ori}$ and $\beta$ are an original color and the occupancy proportion of the selected original pixel respectively, $C_{est}$ and $\alpha$ are the estimated color and the occupancy proportion of the previous estimated partial pixel respectively, $\gamma$ is an overlapping proportion of the selected original pixel and the previous estimated partial pixel, $\gamma$ is obtained by $$\rho \cdot \min(\alpha, \beta) + (1-\rho) \cdot \max(0, \alpha + \beta - 1) \text{ and}$$

$$0 \leq \rho \leq 1.$$

16. The system for developing the new-view image according to claim 10, wherein if the estimated partial pixel are updated completely and a hole is remained in the completely updated estimated partial pixel, then analyzing unit further adjusts the completely updated estimated color of the estimated partial pixel and fully fills the new-view pixel with the adjusted estimated color according to the occupancy proportion of the completely updated estimated partial pixel occupying the new-view pixel.

17. The system for developing the new-view image according to claim 16, wherein the analyzing unit adjusts the completely updated estimated color by $C_{est}/\alpha$, wherein $C_{est}$ and $\alpha$ are the completely updated estimated color and the occupancy proportion of the completely updated estimated partial pixel respectively.

18. The system for developing the new-view image according to claim 10, wherein the new-view image has a plurality of new-view pixels, the estimating unit repeatedly estimates each corresponding position, estimates each occupancy proportion, initially obtains the estimated color and updates the estimated partial pixel to completely update the estimated partial pixel of each new-view pixel.

* * * * *